US011900055B2

(12) United States Patent
Saito et al.

(10) Patent No.: US 11,900,055 B2
(45) Date of Patent: Feb. 13, 2024

(54) SYNONYM EXTRACTION DEVICE, SYNONYM EXTRACTION METHOD, AND SYNONYM EXTRACTION PROGRAM

(71) Applicant: Nippon Telegraph and Telephone Corporation, Tokyo (JP)

(72) Inventors: Tsunenari Saito, Tokyo (JP); Hiroshi Miyao, Tokyo (JP); Satoshi Sunaga, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 371 days.

(21) Appl. No.: 17/431,495

(22) PCT Filed: Feb. 4, 2020

(86) PCT No.: PCT/JP2020/004114
§ 371 (c)(1),
(2) Date: Aug. 17, 2021

(87) PCT Pub. No.: WO2020/170804
PCT Pub. Date: Aug. 27, 2020

(65) Prior Publication Data
US 2022/0138417 A1    May 5, 2022

(30) Foreign Application Priority Data

Feb. 21, 2019  (JP) .................................. 2019-029885

(51) Int. Cl.
*G06F 40/247* (2020.01)
*G06F 40/279* (2020.01)
*G06F 40/268* (2020.01)

(52) U.S. Cl.
CPC .......... *G06F 40/247* (2020.01); *G06F 40/268* (2020.01); *G06F 40/279* (2020.01)

(58) Field of Classification Search
USPC ............................................. 704/7–10, 257
See application file for complete search history.

(56) References Cited

FOREIGN PATENT DOCUMENTS

| JP | 2013020427 | * | 1/2013 |
| JP | 2013020431 | * | 1/2013 |

(Continued)

OTHER PUBLICATIONS

Miyazaki, "Automatic Segmentation Method for Compound Words Using Semantic Dependent Relationships Between Words," Information Processing Society of Japan, 1984, 25(6): 21 pages (With English Translation).

(Continued)

*Primary Examiner* — Leonard Saint-Cyr
(74) *Attorney, Agent, or Firm* — Fish & Richardson P.C.

(57) ABSTRACT

A synonym extraction apparatus determines, for compound words included in the document, that types of nouns constituting the compound word are each a Sahen-noun or another noun type to determine a pattern of a sequence of the types of the nouns constituting the compound word, extracts a group of compound words having an identical pattern of the sequence of the types, extracts compound words having an identical leading or ending word from among them, and creates, for a group of compound words having the identical pattern of the sequence of the nouns and the identical leading or ending word, a co-occurrence vector having, as a component, a noun appearing in the same sentence as the corresponding compound word, and outputs, as synonyms, a group of compound words having a degree of similarity between the co-occurrence vectors of the compound words equal to or greater than a predetermined threshold.

3 Claims, 5 Drawing Sheets

(56) References Cited

FOREIGN PATENT DOCUMENTS

JP          5754019      7/2015
JP     2018088101   *  6/2018

OTHER PUBLICATIONS

Satou et al., "Calculation Method of the Degree of Semantic Similarity Between Noun Phases Consisting of Nouns and Particles," 18th Annual Conference of the Japanese Society for Artificial Intelligence, May 31, 2004, 5 pages (With English Translation).

* cited by examiner

SYNONYM EXTRACTION DEVICE, SYNONYM EXTRACTION METHOD, AND SYNONYM EXTRACTION PROGRAM

CROSS-REFERENCE TO RELATED APPLICATIONS

This application is a National Stage application under 35 U.S.C. § 371 of International Application No. PCT/JP2020/004114, having an International Filing Date of Feb. 4, 2020, which claims priority to Japanese Application Serial No. 2019-029885, filed on Feb. 21, 2019. The disclosure of the prior application is considered part of the disclosure of this application, and is incorporated in its entirety into this application.

TECHNICAL FIELD

The present invention relates to a synonym extraction apparatus, a synonym extraction method, and a synonym extraction program.

BACKGROUND ART

For example, when a development document such as a requirement definition document is created, it is important to describe the document while keeping the uniformity of words in the document for reducing operation at the time of reviewing the document in the subsequent processes and preventing misunderstanding of a specification. Here, an existing document proofreading tool can find out non-uniformity of general single words (e.g., "supervisor" and "management", etc.) by an internal dictionary. However, technical terms mainly composed of compound words are not registered in the internal dictionary, and thus it is difficult to find out non-uniformity of words as described above.

Thus, to find out words that are non-uniform in a document even for compound words, there is a technique to extract synonymous compound words using the degree of similarity between words of compound words. For calculating the degree of similarity between words of compound words here, a co-occurrence vector having a word co-occurring in the vicinity of a compound word as a vector component is used. That is, upon creating co-occurrence vectors of respective compound words, the degree of similarity between the co-occurrence vectors of the respective compound words is calculated, and a compound word having the calculated degree of similarity of a predetermined value or greater is extracted as a synonym.

CITATION LIST

Patent Literature

Patent Literature 1 JP 5754019 B

Non Patent Literature

Non Patent Literature 1: Masahiro MIYAZAKI, "Automatic Segmentation Method for Compound Words Using Semantic Dependent Relationships between Words", Journal of Information Processing, Vol. 25, No. 6, November 1984

Non Patent Literature 2: Masahiko SATO, et al., "Calculation Method of the Degree of Semantic Similarity between Noun Phases Consisting of Nouns and Particles", The 18th Annual Conference of the Japanese Society for Artificial Intelligence, 2004

SUMMARY OF THE INVENTION

Technical Problem

However, in the related art, when the degree of similarity between compound words is calculated only by co-occurrence vectors of the compound words, the calculation accuracy of the degree of similarity is not necessarily high, which leads to a problem in which a synonym of a compound word cannot be extracted accurately from a document. Thus, an object of the present invention is to solve the problem described above and to accurately extract a synonym of a compound word.

Means for Solving the Problem

In order to solve the problem described above, the present invention includes: a determination unit configured to determine, for compound words included in a document, that types of nouns constituting a compound word of the compound words are each a Sahen-noun or a noun other than a Sahen-noun; a first extraction unit configured to extract, from among the compound words included in the document, a group of compound words having an identical pattern of a sequence of the determined types of the nouns constituting the compound word, based on a determination result of the type of each of the nouns constituting the compound word; a second extraction unit configured to extract a group of compound words having an identical leading or ending word from the group of compound words having the identical pattern of the sequence of the determined types of the nouns; a co-occurrence vector creation unit configured to create, for each compound word of the group of compound words extracted by the second extraction unit, a co-occurrence vector having, as a vector component, a noun co-occurring in a same sentence as a sentence including the compound word; a similarity degree calculation unit configured to calculate, for each compound word of the group of compound words extracted by the second extraction unit, a degree of similarity between the created co-occurrence vectors; and an output unit configured to output, as synonyms, a group of compound words having the degree of similarity between the created co-occurrence vectors equal to or greater than a predetermined threshold.

Effects of the Invention

According to the present invention, a synonym of a compound word can be accurately extracted.

DESCRIPTION OF EMBODIMENTS

Hereinafter, modes for carrying out the present invention (embodiments) will be described with reference to the drawings, and the embodiments include a first embodiment and a second embodiment separately described. The present invention is not limited to the embodiments.

First Embodiment

An overview of a synonym extraction apparatus according to the first embodiment will be described with reference to FIG. 1. The synonym extraction apparatus extracts a synonym of a compound word from a predetermined document. Herein, the compound word means a word including a plurality of nouns and is, for example, a word such as "ファイル更新 (fairu koushin/file update)" or "課金方式 (kakin housiki/charge scheme)".

The synonym extraction apparatus first extracts compound words from a document from which a synonym is to be extracted. Then, the synonym extraction apparatus sets the extracted compound words to first candidates for a synonym by the processing of (A) and (B) below.

That is, the synonym extraction apparatus first extracts compound words having an identical subdivision pattern of nouns constituting the compound words ((A)). The subdivision pattern of nouns is a pattern of a sequence of types (a Sahen-noun or a general noun (other than a Sahen-noun)) of nouns constituting a compound word. Note that the Sahen-noun in the following description is a noun that can be linked to a Japanese verb "sum" to become a verb of "sa"-line irregular conjugation. For example, the "更新 (koushin/update)" included in the "ファイル更新 (fairu koushin/file update)" described above is a Sahen-noun.

First, the synonym extraction apparatus determines that a type of each of nouns constituting the compound words is a Sahen-noun or a general noun (noun other than a Sahen-noun). The synonym extraction apparatus then classifies each of the compound words into any of the subdivision patterns shown in (1) to (4) of FIG. 1 based on the above determination results.

For example, because compound words such as "ファイル更新 (fairu koushin/file update)" or "データベース更新 (dehtabehsu koushin/database update)" each include a general noun and a Sahen-noun in this order, the synonym extraction apparatus classifies them into a pattern ((1)) of "general noun+Sahen-noun (+Sahen-noun)". Furthermore, because compound words such as "課金方式 (kakin housiki/charge scheme)" or "保留状態 (horyu joutai/pending state)" each include a Sahen-noun and a general noun in this order, the synonym extraction apparatus classifies them into a pattern ((2)) of "Sahen-noun (+Sahen-noun)+general noun".

Additionally, because compound words such as "トラヒック条件 (torahikku jouken/traffic condition)" or "データフォーマット (dehta fohmatto/data format)" each include a general noun and a general noun in this order, the synonym extraction apparatus classifies them into a pattern ((3)) of "general noun+general noun (+general noun)". Furthermore, because compound words such as "再開制御 (sai-kai seigyo/restart control)" each include a Sahen-noun and a Sahen-noun in this order, the synonym extraction apparatus classifies them into a pattern ((4)) of "Sahen-noun+Sahen-noun (+Sahen-noun)".

The synonym extraction apparatus then extracts compound words having an identical leading or ending noun of nouns constituting the compound words ((B)), among the compound words having the identical pattern (subdivision pattern) extracted in (A) above.

For example, because a compound word "データベース更新 (dehtabehsu koushin/database update)" includes a general noun and a Sahen-noun in this order, it corresponds to (1) of the subdivision patterns described above. Thus, the synonym extraction apparatus extracts "データベース変更 (dehtabehsu henkoh/database change)" and "データベース構築 (dehtabehsu kohchiku/database building)" each having a leading word ("データベース (dehtabehsu/database)") common to "データベース更新 (dehtabehsu koushin/database update)" from a group of the compound words corresponding to (1) of the subdivision patterns described above.

The synonym extraction apparatus also extracts "ファイル更新 (fairu koushin/file update)", "メモリ更新 (memori koushin/memory update)", and "D B 更新 (DB koushin/DB update)" each having an ending word ("更新 (koushin/update)") common to "データベース更新 (dehtabehsu koushin/database update)" from the group of the compound words corresponding to (1) of the subdivision patterns described above. The synonym extraction apparatus then extracts these extracted compound words as first candidates for the synonym of "データベース更新 (dehtabehsu koushin/database update)".

Then, for each of the extracted first candidate compound words, the synonym extraction apparatus extracts a co-occurrence vector of a noun that co-occurs in the same sentence as the corresponding compound word, calculates the degree of similarity between co-occurrence vectors of the compound words, and presents a compound word having the degree of similarity equal to or greater than a threshold to a user.

Consider, for example, a case where the degrees of similarity of the "データベース変更 (dehtabehsu henkoh/database change)", "データベース構築 (dehtabehsu kohchiku/database building)", "ファイル更新 (fairu koushin/file update)", "メモリ更新 (memori koushin/memory update)", and "D B 更新 (DB koushin/DB update)" with respect to "データベース更新 (dehtabehsu koushin/database update)" are values shown in reference numeral 101. In this case, the synonym extraction apparatus presents "データベース変更 (dehtabehsu henkoh/database change)" and "D B 更新 (DB koushin/DB update)", which are compound words each having the degree of similarity to "データベース更新 (dehtabehsu koushin/database update)" equal to or greater than a threshold, to a user as synonyms for "データベース 更新 (dehtabehsu koushin/database update)". In this way, the synonym extraction apparatus can accurately extract a synonym of a compound word.

Figure 2:
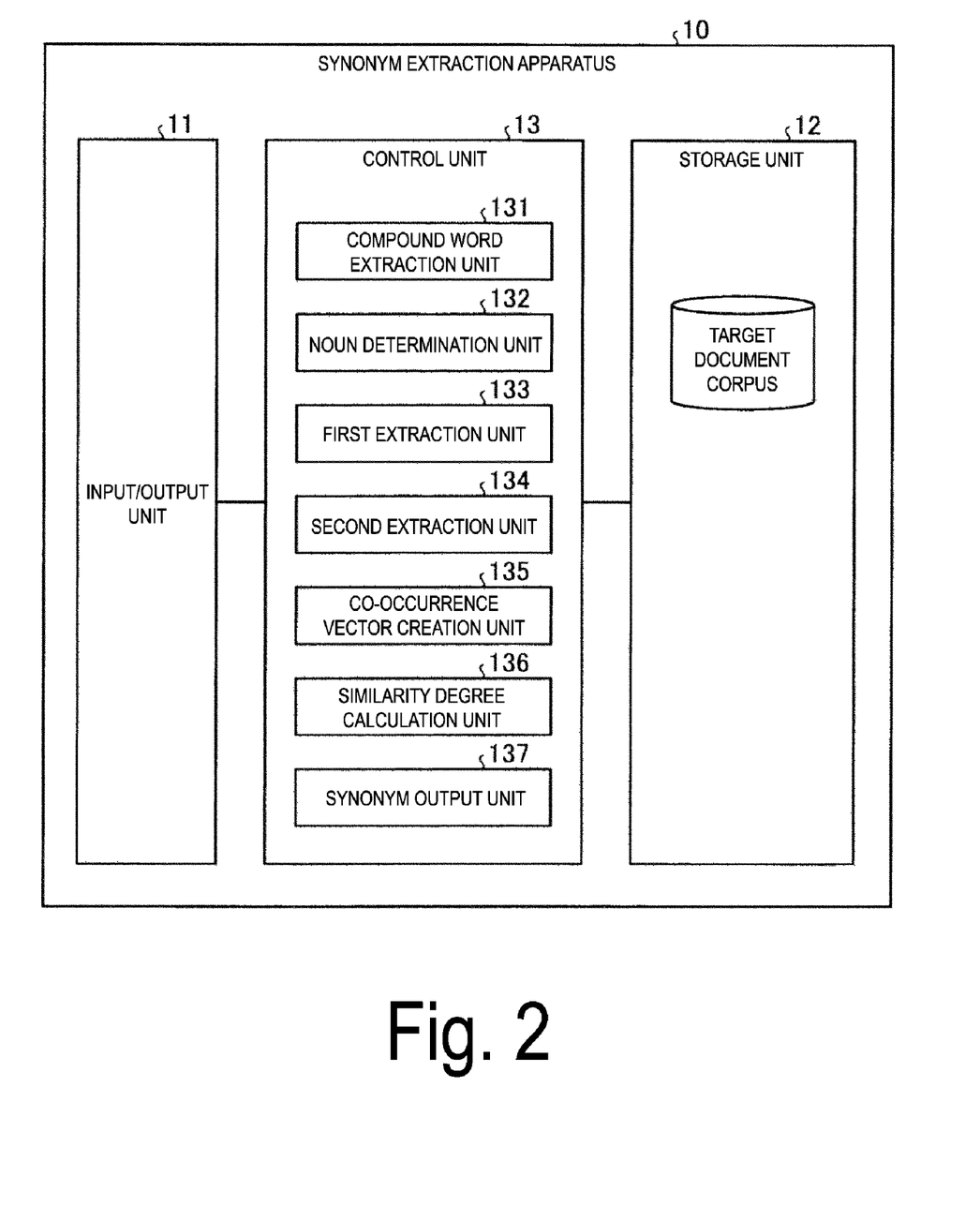
FIG. 2 is a diagram illustrating a configuration example of a synonym extraction apparatus of the first embodiment.

Next, a configuration example of a synonym extraction apparatus will be described. As illustrated in FIG. 2, for example, a synonym extraction apparatus 10 includes an input/output unit 11, a storage unit 12, and a control unit 13.

The input/output unit 11 inputs and outputs various types of data. For example, the input/output unit 11 receives input of document data from which synonyms are to be extracted (e.g., a target document corpus), and outputs a group of compound words determined to be synonyms.

The storage unit 12 stores various types of data used in extraction processing of synonyms. The storage unit 12 stores, for example, a target document corpus input via the input/output unit 11, which is document data from which synonyms are to be extracted.

The control unit 13 controls the entire synonym extraction apparatus 10. The control unit 13 includes, for example, a compound word extraction unit 131, a noun determination unit (determination unit) 132, a first extraction unit 133, a second extraction unit 134, a co-occurrence vector creation unit 135, a similarity degree calculation unit 136, and a synonym output unit 137.

The compound word extraction unit 131 extracts a compound word from a document from which a synonym is to be extracted (e.g., a target document corpus). For example, the compound word extraction unit 131 performs morphological analysis of a target document corpus, links continuing nouns, and extracts the linked nouns as a compound word.

For the compound word extracted by the compound word extraction unit 131, the noun determination unit 132 determines that types of nouns constituting the corresponding compound word are a Sahen-noun or a general noun.

For each of compound words, the first extraction unit 133 determines which pattern of the patterns shown in (1) to (4) described above a pattern (subdivision pattern) of a sequence of types of nouns constituting the corresponding compound word corresponds to. Then, the first extraction unit 133 extracts a group of compound words corresponding to the identical subdivision pattern.

The second extraction unit 134 extracts compound words having an identical leading or ending word from the group of compound words having the identical subdivision pattern extracted by the first extraction unit 133.

For example, for "データベース更新 (dehtabehsu koushin/database update)" the subdivision pattern of which corresponds to (1) general noun+Sahen-noun (+Sahen-noun), the second extraction unit 134 extracts a compound word in which the leading word is a "データベース (dehtabehsu/database)" and a compound word in which the ending (last) word is "更新 (koushin/update)" from a group of compound words belonging to the identical subdivision pattern (1).

It is also conceivable that a compound word includes three or more words. In this case, the second extraction unit 134 extracts the word group anterior to the ending word of the compound word as the leading word. For example, for a compound word "データベース更新規制 (dehtabehsu koushin kisei/database update regulation)", the second extraction unit 134 extracts "データベース更新 (dehtabehsu koushin/database update)" anterior to the ending word "規制 (kisei/regulation)" as the leading word.

The co-occurrence vector creation unit 135 creates a co-occurrence vector for each of the compound words extracted by the second extraction unit 134. Specifically, for each of the compound words extracted by the second extraction unit 134 (that is, compound words corresponding to the identical subdivision pattern and having an identical leading or ending word), the co-occurrence vector creation unit 135 creates a co-occurrence vector having, as a vector component, a noun co-occurring in the same sentence as the sentence including the corresponding compound word. For example, the co-occurrence vector creation unit 135 creates a co-occurrence vector for each of "データベース更新 (dehtabehsu koushin/database update)", "データベース変更 (dehtabehsu henkoh/database change)", "データベース構築 (dehtabehsu kohchiku/database building)", "ファイル更新 (fairu koushin/file update)", "メモリ更新 (memori koushin/memory update)", and "D B 更新 (DB koushin/DB update)" described above.

For example, consider a case where the co-occurrence vector creation unit 135 creates a co-occurrence vector for "ファイル更新 (fairu koushin/file update)". In this case, when nouns that co-occur in the same sentence as the sentence including "ファイル更新 (fairu koushin/file update)" are "転送 (tensou/forwarding)", "系切替え (kei kirikae/system switching)", "再開 (saikai/restart)", "異世代 (isedai/different generation)", and "サービス中断 (sahbisu chuhdan/service interruption)", and the numbers of times of appearance of the nouns in the sentence are "2", "5", "3", "2", and "3", respectively, the co-occurrence vector creation unit 135 creates a co-occurrence vector shown in reference numeral 401 in FIG. 4.

It should be noted that when the co-occurrence vector creation unit 135 creates a co-occurrence vector of a compound word, a range from which a co-occurring noun is extracted may be the same sentence as the sentence including the corresponding compound word, may be the same paragraph as the paragraph including the corresponding compound word, or may be the same document as the document including the compound word.

Description will be provided with reference to FIG. 2 again. The similarity degree calculation unit 136 calculates the degree of similarity between the co-occurrence vectors of the compound words extracted by the second extraction unit 134. In other words, for compound words corresponding to the identical subdivision pattern and having an identical leading or ending word, the similarity degree calculation unit 136 calculates the degrees of similarity among the compound words using the co-occurrence vectors of the corresponding compound words.

The synonym output unit 137 outputs a group of compound words each having a degree of similarity calculated by the similarity degree calculation unit 136, which is equal to or greater than a predetermined threshold, as synonyms. For example, the synonym output unit 137 outputs "データベース変更 (dehtabehsu henkoh/database change)" and "D B 更新 (DB koushin/DB update)" as synonyms for "データベース更新 (dehtabehsu koushin/database update)" when compound words each having the degree of similarity to "データベース更新 (dehtabehsu koushin/database update" of equal to or greater than the threshold are "データベース変更 (dehtabehsu henkoh/database change)" and "D B 更新 (DB koushin/DB update)".

With such a synonym extraction apparatus, a synonym for a compound word can be accurately extracted.

Example of Processing Procedure

Figure 3:
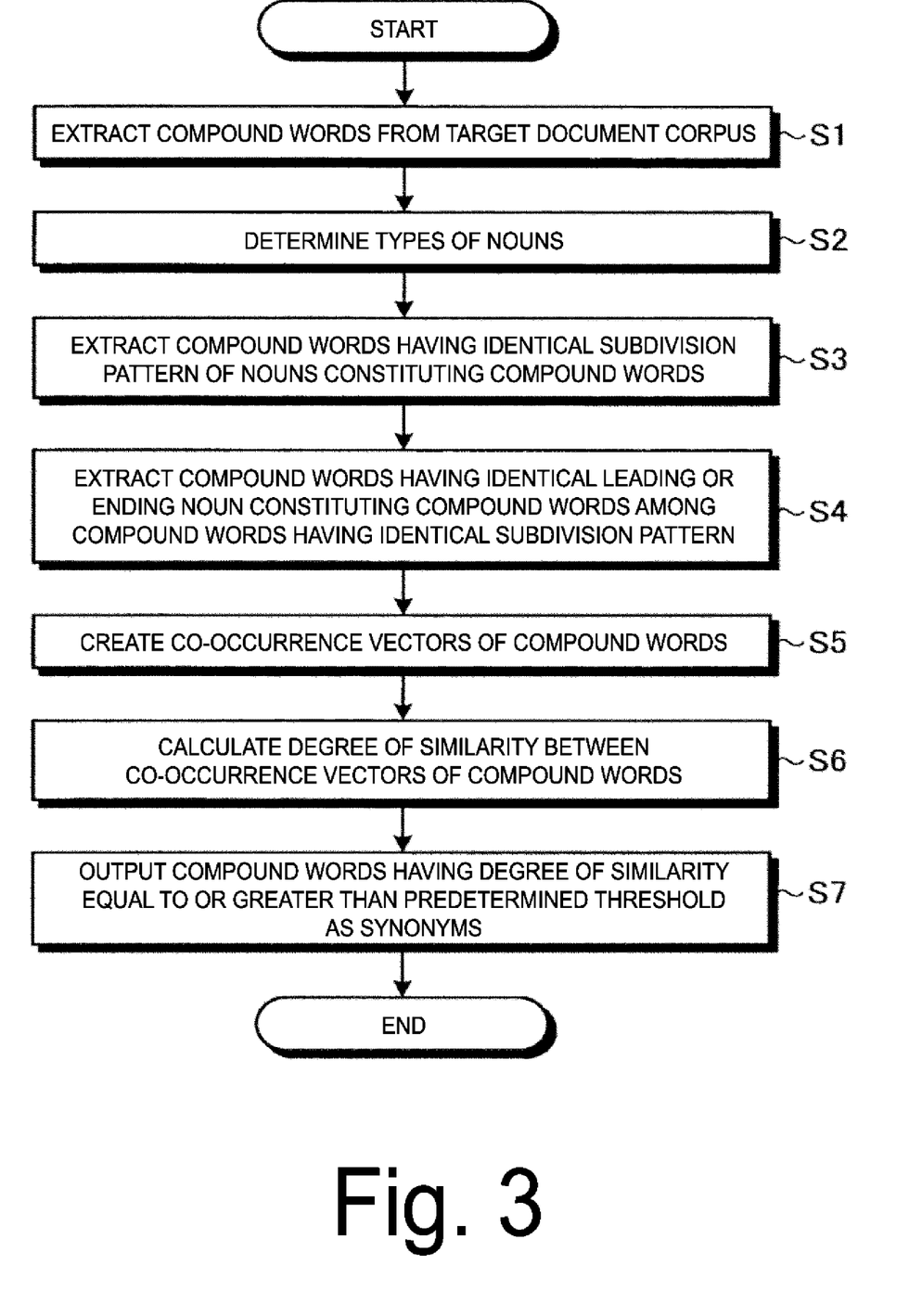
FIG. 3 is a flowchart illustrating an example of a processing procedure of the synonym extraction apparatus in FIG. 2.

Next, a processing procedure of the synonym extraction apparatus 10 will be described with reference to FIG. 3. First, the compound word extraction unit 131 of the synonym extraction apparatus 10 extracts compound words from a target document corpus by performing morphological analysis or the like of the target document corpus (S1). Then, the noun determination unit 132 determines types of nouns constituting the compound words extracted at S1 (a Sahen-noun or a general noun) (S2).

After S2, the first extraction unit 133 extracts compound words having an identical subdivision pattern of nouns constituting the compound words from the compound words extracted at S1, based on the determination result of types of nouns at S2 (S3). Then, the second extraction unit 134 extracts compound words having an identical leading or ending noun of nouns constituting the compound words among the compound words having the identical subdivision pattern extracted at S3 (S4).

After S4, for each of the compound words extracted at S4, the co-occurrence vector creation unit 135 creates a co-occurrence vector having, as a vector component, a noun co-occurring in the same sentence as the sentence including the corresponding compound word (S5: Create co-occurrence vector of compound word).

After S5, the similarity degree calculation unit 136 calculates degrees of similarity among the co-occurrence vectors of the compound words extracted at S4 (S6). Then, the synonym output unit 137 outputs a compound word having a degree of similarity calculated at S6, which is equal to or greater than a predetermined threshold, as a synonym (S7).

In this way, the synonym extraction apparatus 10 can extract a synonym of a compound word with high accuracy.

Second Embodiment

It should be noted that when the synonym extraction apparatus 10 creates a co-occurrence vector of a compound word, co-occurrence vectors may be created for not only a compound word (e.g., "ファイル更新 (fairu koushin/file update)") but also a character string (e.g., "ファイルを更新 (fairu wo koushin/update file)" and "ファイルの更新 (fairu no koushin/update of file)") in which a case particle (e.g., "no" or "wo" in Japanese) is added between the nouns constituting the compound word to calculate a degree of similarity between compound words, based on a co-occurrence vector obtained by causing the co-occurrence vectors to overlap with (be added to) each other. In this way, the synonym extraction apparatus 10 can more accurately extract synonyms of compound words.

Hereinafter, a procedure will be described in which the co-occurrence vector creation unit 135 of the synonym extraction apparatus 10 of the second embodiment creates a co-occurrence vector (overlapping co-occurrence vector) obtained by causing co-occurrence vectors of the character string described above to overlap with each other. First, consider a case where the co-occurrence vector creation unit 135 creates an overlapping co-occurrence vector of a compound word corresponding to the subdivision pattern shown in (1) of FIG. 1 (general noun+Sahen-noun (+Sahen-noun)).

Figure 1:
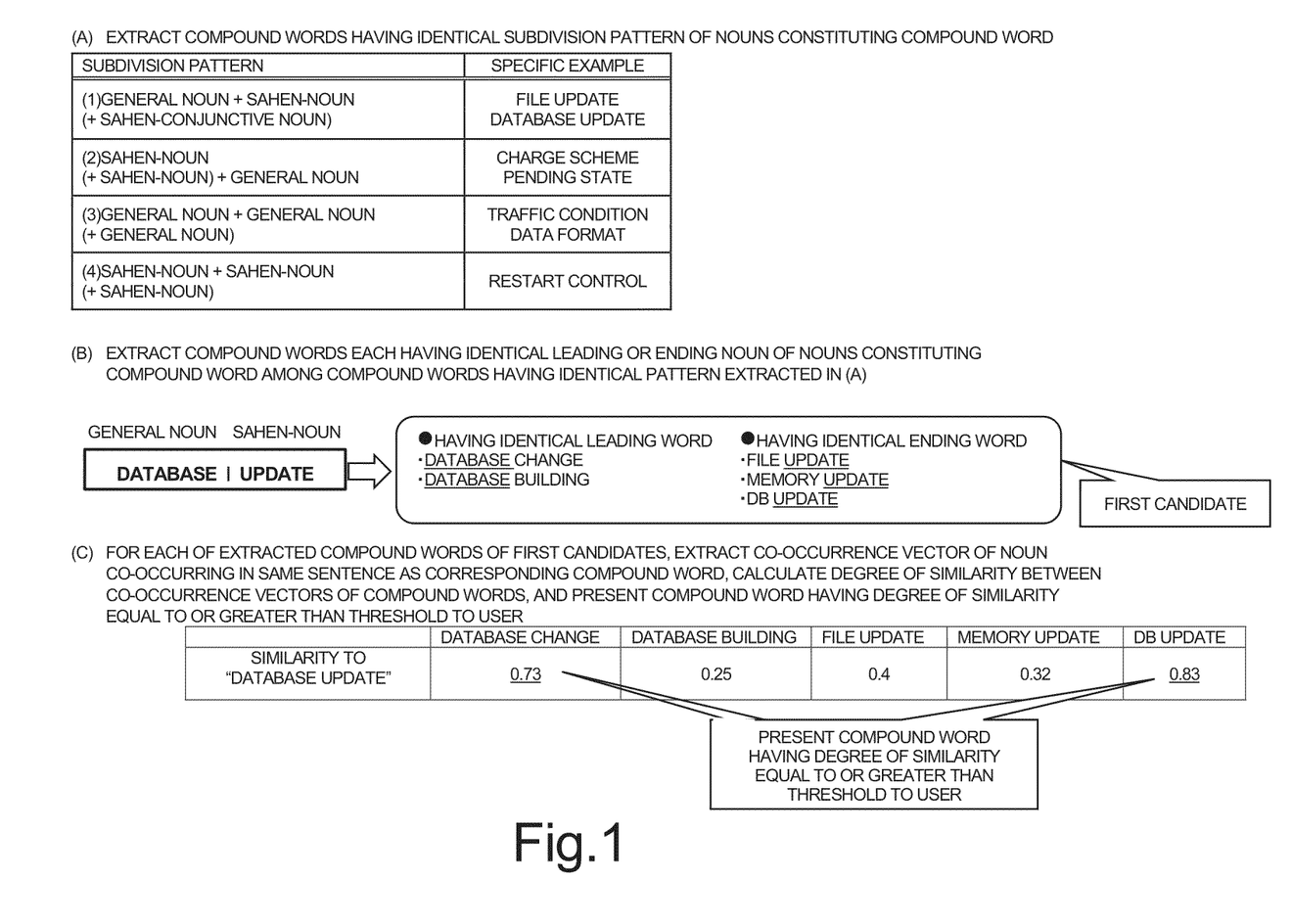
FIG. 1 is a diagram illustrating an overview of a first embodiment.

In the case of the compound word corresponding to the subdivision pattern shown in (1) of FIG. 1, the relationship between nouns constituting the compound word is often a relationship of an object and a predicator. Thus, the co-occurrence vector creation unit 135 creates a character string in which "no" or "wo" is added between "nouns" of the compound word, and creates a co-occurrence vector having, as a vector component, a noun co-occurring in the same sentence as the sentence including the character string.

Figure 4:
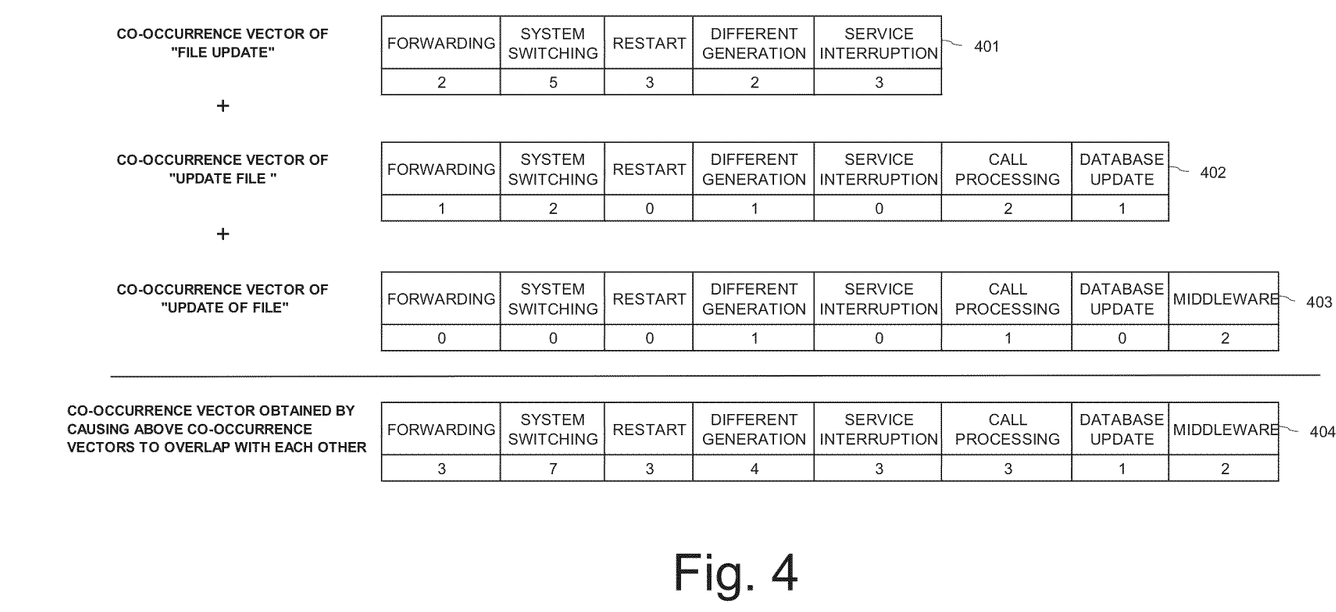
FIG. 4 is a diagram illustrating an example of creation of a co-occurrence vector in a second synonym extraction apparatus.

For example, for "ファイル更新 (fairu koushin/file update)", the co-occurrence vector creation unit 135 first creates a co-occurrence vector 401 having, as a vector component, a noun co-occurring in the same sentence as the sentence included in the "ファイル更新 (fairu koushin/file update)".

The co-occurrence vector creation unit 135 also creates a character string of "ファイル を更新 (fairu wo koushin/update file)" in which a case particle "wo" is added between "ファイル (fairu/file)" and "更新 (koushin/update)" constituting "ファイルを更新 (fairu wo koushin/update file)". Then, the co-occurrence vector creation unit 135 creates a co-occurrence vector 402 having, as a vector component, a nouns co-occurring in the same sentence as the sentence including this "ファイルを更新 (fairu wo koushin/update file)".

Furthermore, the co-occurrence vector creation unit 135 creates a character string of "フ ァイルの更新 (fairu no koushin/update of file)" in which a case particle "no" is added between "ファイル (fairu/file)" and "更新 (koushin/update)". Then, the co-occurrence vector creation unit 135 creates a co-occurrence vector 403 having, as a vector component, a noun co-occurring in the same sentence as the sentence including this "ファイルの更新 (fairu no koushin/file no update)". Then, the co-occurrence vector creation unit 135 creates a co-occurrence vector 404 obtained by causing the above-described co-occurrence vectors 401 to 403 to overlap with each other.

Thereafter, the similarity degree calculation unit 136 calculates degrees of similarity between compound words by using, as the co-occurrence vector of the compound word "ファイ ル更新 (fairu koushin/file update)", the co-occurrence vector 404 obtained by the overlapping described above.

In a case of a compound word corresponding to the subdivision pattern shown in (2) of FIG. 1 (Sahen-noun (+Sahen-noun)+a general noun), the relationship between nouns constituting the compound word is often a relationship of a modifying word and a modified word. Thus, the co-occurrence vector creation unit 135 of the synonym extraction apparatus 10 creates a character string having "no" or "ni kansuru" between "nouns" of the compound word.

For example, for "課金方式 (kakin housiki/charge scheme)", the co-occurrence vector creation unit 135 creates a character string "課金の方式 (kakin no housiki/scheme of charge)" in which "no" is added between "課金 (kakin/charge)" and "方式 (housiki/scheme)", and a character string "課金に関する方式 (kakin ni kansuru housiki/charge-related scheme)" in which "ni kansuru" is added between "課金 (kakin/charge)" and "方式 (housiki/scheme)". Then, for each of the above character strings, the co-occurrence vector creation unit 135 creates a co-occurrence vector having, as a vector component, a noun co-occurring in the same sentence as the sentence including the corresponding character string, and creates a co-occurrence vector obtained by causing the co-occurrence vectors of the two character strings described above to overlap with the co-occurrence vector of "課金方式 (kakin housiki/charge scheme)".

In a case of a compound word corresponding to the subdivision pattern shown in (3) of FIG. 1 (general noun+ general noun (+general noun)), the relationship between nouns constituting the compound word is often a relationship of a modifying word and a modified word. Thus, the co-occurrence vector creation unit 135 creates an overlapping co-occurrence vector, similarly to the case of the compound word corresponding to the subdivision pattern shown in (2) of FIG. 1.

In a case of a compound word corresponding to the subdivision pattern shown in (4) of FIG. 1 (Sahen-noun+ Sahen-noun (+Sahen-noun)), the relationship between nouns constituting the compound word is often a relationship of an object and a predicator. Thus, the co-occurrence vector creation unit 135 creates an overlapping co-occurrence vector similarly to the case of the compound word corresponding to the subdivision pattern shown in (1) of FIG. 1.

In this way, the synonym extraction apparatus 10 can more accurately extract a synonym of a compound word.

Program

It is possible to implement a program, which realizes the function of the synonym extraction apparatus 10 described in the above embodiments, by installing the program in a desired information processing apparatus (computer). For example, the information processing apparatus can function as the synonym extraction apparatus 10 by causing the information processing apparatus to execute the above-described program provided as package software or on-line software. The information processing apparatus described here includes a desktop or laptop personal computer, a rack-mount type server computer, and the like. Additionally, the information processing apparatus includes a mobile communication terminal such as a smartphone, a mobile phone, and a Personal Handyphone System (PHS), as well as Personal Digital Assistant (PDA). In addition, the synonym extraction apparatus 10 may be mounted in a cloud server.

Figure 5:
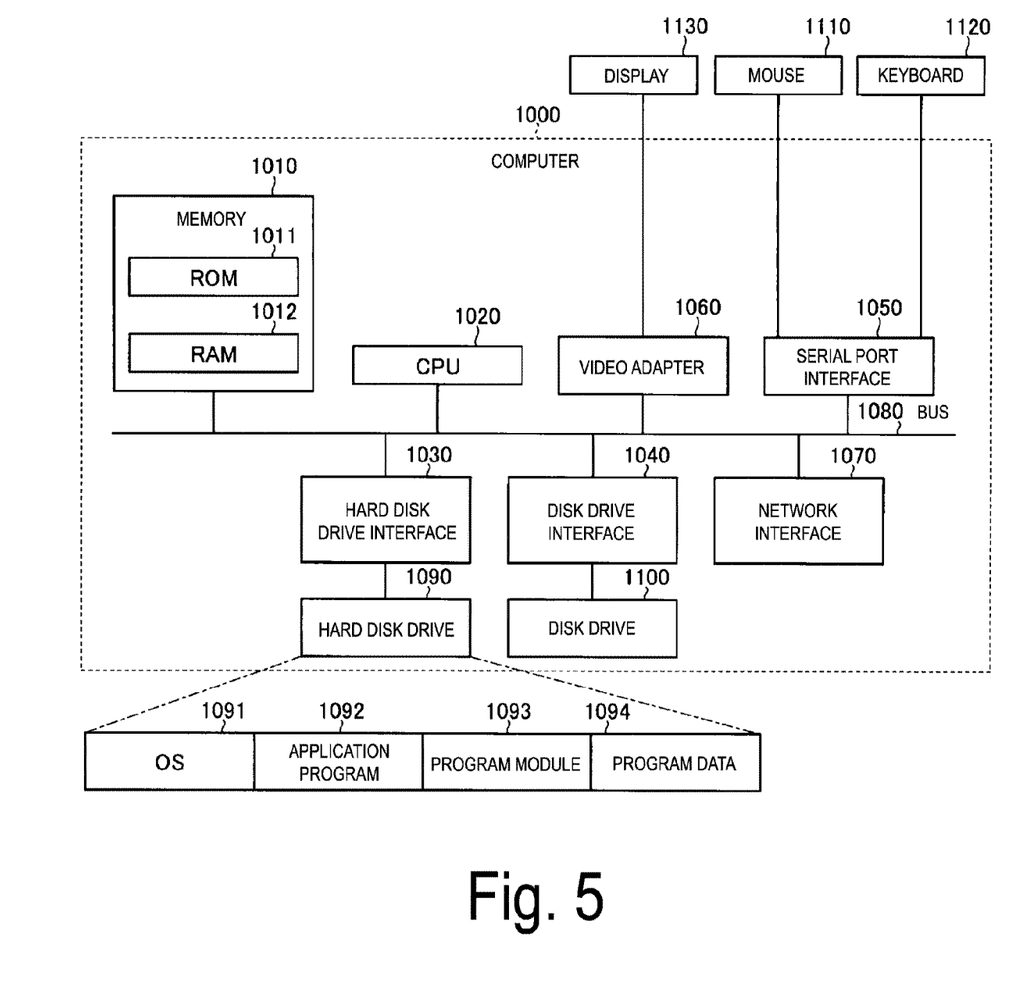
FIG. 5 is a diagram illustrating an example of a computer that executes a synonym extraction program.

An example of a computer that executes the above program (synonym extraction program) will be described with reference to FIG. 5. A computer 1000 includes, for example, a memory 1010, a CPU 1020, a hard disk drive interface 1030, a disk drive interface 1040, a serial port interface 1050, a video adapter 1060, and a network interface 1070, as illustrated in FIG. 5. These units are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094, as illustrated in FIG. 5. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as appropriate, and executes each of the aforementioned procedures.

It should be noted that the program module 1093 and the program data 1094 related to the synonym extraction program described above are not necessarily stored in the hard disk drive 1090, and may be stored in a removable storage medium to be read out by the CPU 1020 via the disk drive 1100 or the like, for example. Alternatively, the program module 1093 and the program data 1094 related to the program described above may be stored in another computer connected via a network such as a LAN or a wide area network (WAN), and may be read by the CPU 1020 via the network interface 1070.

REFERENCE SIGNS LIST

10 Synonym extraction apparatus
11 Input/output unit
12 Storage unit
13 Control unit
131 Compound word extraction unit
132 Noun determination unit
133 First extraction unit
134 Second extraction unit
135 Co-occurrence vector creation unit
136 Similarity degree calculation unit
137 Synonym output unit

The invention claimed is:
1. A synonym extraction apparatus comprising:
a determination unit, including one or more computers, configured to determine, for compound words included in a document, that types of nouns constituting a compound word of the compound words are each a Sahen-noun or a noun other than a Sahen-noun;
a first extraction unit, including one or more computers, configured to extract, from among the compound words included in the document, a first group of compound words having an identical pattern of a sequence of the determined types of the nouns constituting the compound word, based on a determination result of the types of nouns constituting the compound word;
a second extraction unit, including one or more computers, configured to extract a second group of compound words having an identical leading or ending word from the first group of compound words having the identical pattern of the sequence of the determined types of the nouns;
a co-occurrence vector creation unit, including one or more computers, configured to create, for each compound word of the second group of compound words extracted by the second extraction unit, a co-occurrence vector having, as a vector component, a noun co-occurring in a same sentence as a sentence including the compound word;
a similarity degree calculation unit, including one or more computers, configured to calculate, for each compound word of the second group of compound words extracted by the second extraction unit, a degree of similarity between the created co-occurrence vectors; and
an output unit, including one or more computers, configured to output to a display device, as synonyms, a third group of compound words having the degree of similarity between the created co-occurrence vectors equal to or greater than a predetermined threshold, wherein for each compound word of the group of compound words extracted by the second extraction unit,
the co-occurrence vector creation unit is further configured to create, for a character string obtained by adding a case particle between nouns constituting the compound word, a first co-occurrence vector of the compound word having, as a vector component, a noun co-occurring in a same sentence as a sentence including the character string, and create a second co-occurrence vector of the compound word by adding the first co-occurrence vector of the compound word created to the co-occurrence vector of the compound word, and
the similarity degree calculation unit is configured to calculate a degree of similarity between the second co-occurrence vectors of the compound words as the degree of similarity between the created co-occurrence vectors of the compound words.

2. A synonym extraction method performed by a synonym extraction apparatus, the synonym extraction method comprising:
determining, for compound words included in a document, that types of nouns constituting a compound word of the compound words are each a Sahen-noun or a noun other than a Sahen-noun;
extracting, based on a determination result of the types of nouns constituting the compound word, a first group of compound words having an identical pattern of a sequence of the determined types of the nouns constituting the compound word from among compound words included in the document;
extracting a second group of compound words having an identical leading or ending word from the first group of compound words having the identical pattern of the sequence of the determined types of the nouns;
creating, for each compound word of the second group of compound words, a co-occurrence vector having, as a vector component, a noun co-occurring in a same sentence as a sentence including the compound word;
calculating, for each compound word of the second group of compound words, a degree of similarity between created co-occurrence vectors;
outputting, as synonyms, a third group of compound words having the degree of similarity between the created co-occurrence vectors equal to or greater than a predetermined threshold; and
for each compound word of the second group of compound words that have been extracted,
creating, fora character string obtained by adding a case particle between nouns constituting the compound word, a first co-occurrence vector of the compound word having, as a vector component, a noun co-occurring in a same sentence as a sentence including the character string, and creating a second co-occurrence vector of the compound word by adding the first co-occurrence vector of the compound word created to the co-occurrence vector of the compound word, and
calculating a degree of similarity between the second co-occurrence vectors of the compound words as the degree of similarity between the created co-occurrence vectors of the compound words.

3. A non-transitory computer readable medium comprising a synonym extraction program configured to cause a computer to execute a method comprising:
determining, for compound words included in a document, that types of nouns constituting a compound word of the compound words are each a Sahen-noun or a noun other than a Sahen-noun;
extracting, based on a determination result of the types of nouns constituting the compound word, a first group of compound words having an identical pattern of a sequence of the determined types of the nouns constituting the compound word from among the compound words included in the document;
extracting a second group of compound words having an identical leading or ending word from the first group of compound words having the identical pattern of the sequence of the determined types of the nouns;
creating, for each compound word of the second group of compound words, a co-occurrence vector having, as a vector component, a noun co-occurring in a same sentence as a sentence including the compound word;
calculating, for each compound word of the second group of compound words, a degree of similarity between the created co-occurrence vectors;
outputting, as synonyms, a third group of compound words having the degree of similarity between the created co-occurrence vectors equal to or greater than a predetermined threshold; and
for each compound word of the second group of compound words that have been extracted,
creating, for a character string obtained by adding a case particle between nouns constituting the compound word, a first co-occurrence vector of the compound word having, as a vector component, a noun co-occurring in a same sentence as a sentence including the character string, and creating a second co-occurrence vector of the compound word by adding the first co-occurrence vector of the compound word created to the co-occurrence vector of the compound word, and
calculating a degree of similarity between the second co-occurrence vectors of the compound words as the degree of similarity between the created co-occurrence vectors of the compound words.

\* \* \* \* \*